United States Patent [19]

Fort

[11] Patent Number: 5,005,943
[45] Date of Patent: Apr. 9, 1991

[54] RIGID VIDEO-ENDOSCOPE HAVING A ROTATABLE DEVICE FOR ADJUSTING THE ORIENTATION OF AN IMAGE RELATIVE TO AN IMAGE RECEIVING DEVICE

[75] Inventor: Francois Fort, Paris, France

[73] Assignee: Fibres Optiques Recherche et Technologie, Dourdan, France

[21] Appl. No.: 448,112

[22] Filed: Dec. 12, 1989

[30] Foreign Application Priority Data

Dec. 12, 1988 [FR] France ................... 88 16301

[51] Int. Cl.⁵ .......................... G02B 23/26; A61B 1/00
[52] U.S. Cl. ...................................... 350/96.26; 128/4
[58] Field of Search ............... 350/96.10, 96.24–96.27; 128/4, 6

[56] References Cited

U.S. PATENT DOCUMENTS

| 4,063,796 | 12/1977 | Hiltebrandt | 350/70 |
| 4,140,364 | 2/1979 | Yamashita et al. | 350/26 |
| 4,730,909 | 3/1988 | Takahashi | 350/445 |
| 4,870,950 | 10/1989 | Kanbara et al. | 128/6 |
| 4,905,082 | 2/1990 | Nishigaki et al. | 128/6 X |

FOREIGN PATENT DOCUMENTS 0096761 12/1983 European Pat. Off. .
0172680 2/1986 European Pat. Off. .

Primary Examiner—Akm Ullah
Attorney, Agent, or Firm—Browdy and Neimark

[57] ABSTRACT

A rigid video-endoscope having an optical system which provide a rotatable image of an object to be observed is shown and described. The optical system is inside a rigid tube. A camera who's axis is in alignment with the optical axis of the optical system picks up the image provided by the optical system. A bundle of optical fibers passing along the tube is connected to a light source for illumination of the object to be observed. Rotation of the image provided by the optical system which adjusts the orientation of the image relative to an observer. The rotating device is disposed inside a handle of the video-endoscope together with the camera and disposed between the camera and the optical system.

6 Claims, 4 Drawing Sheets

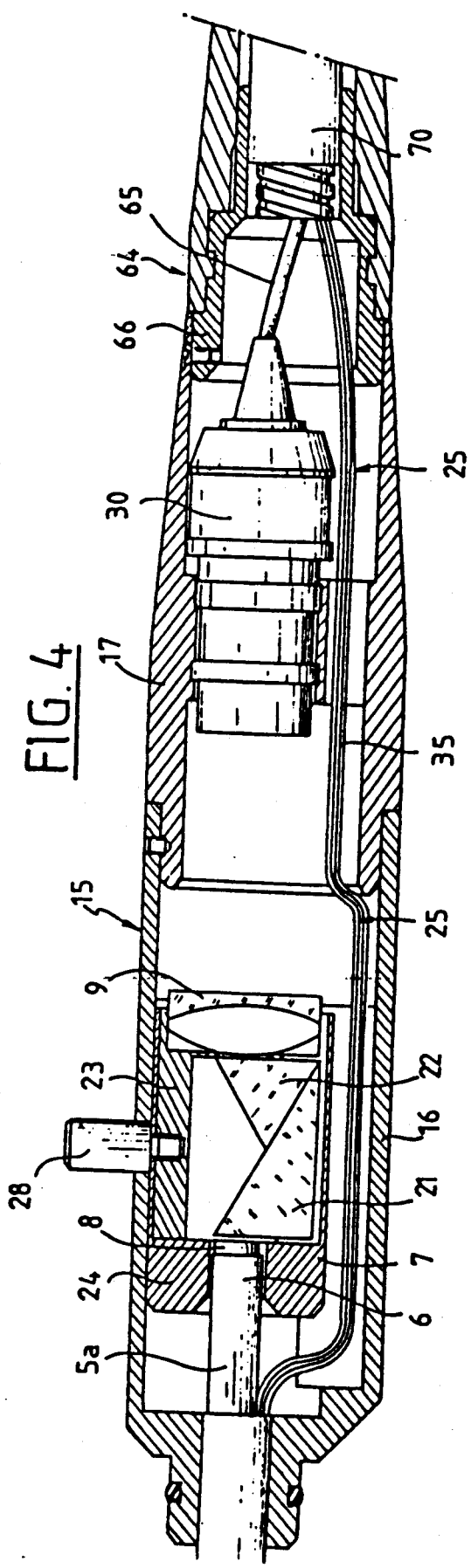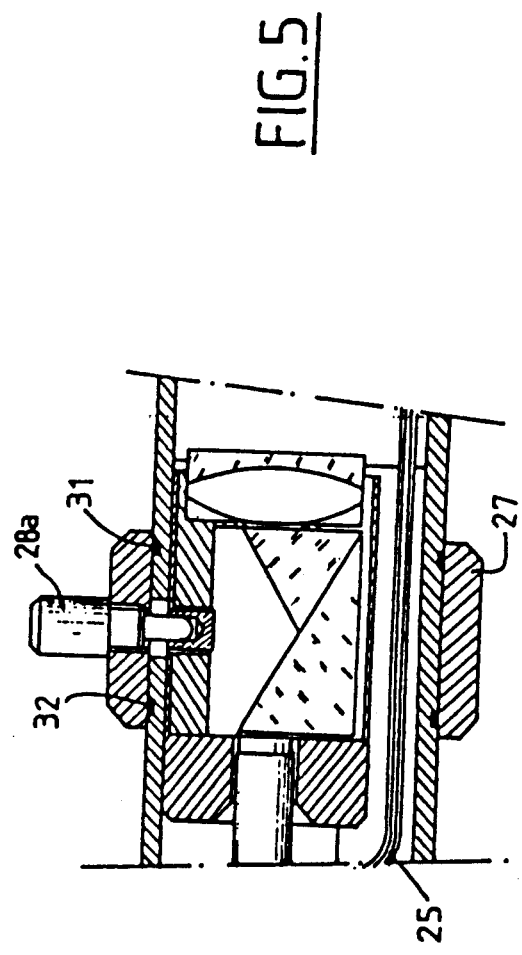

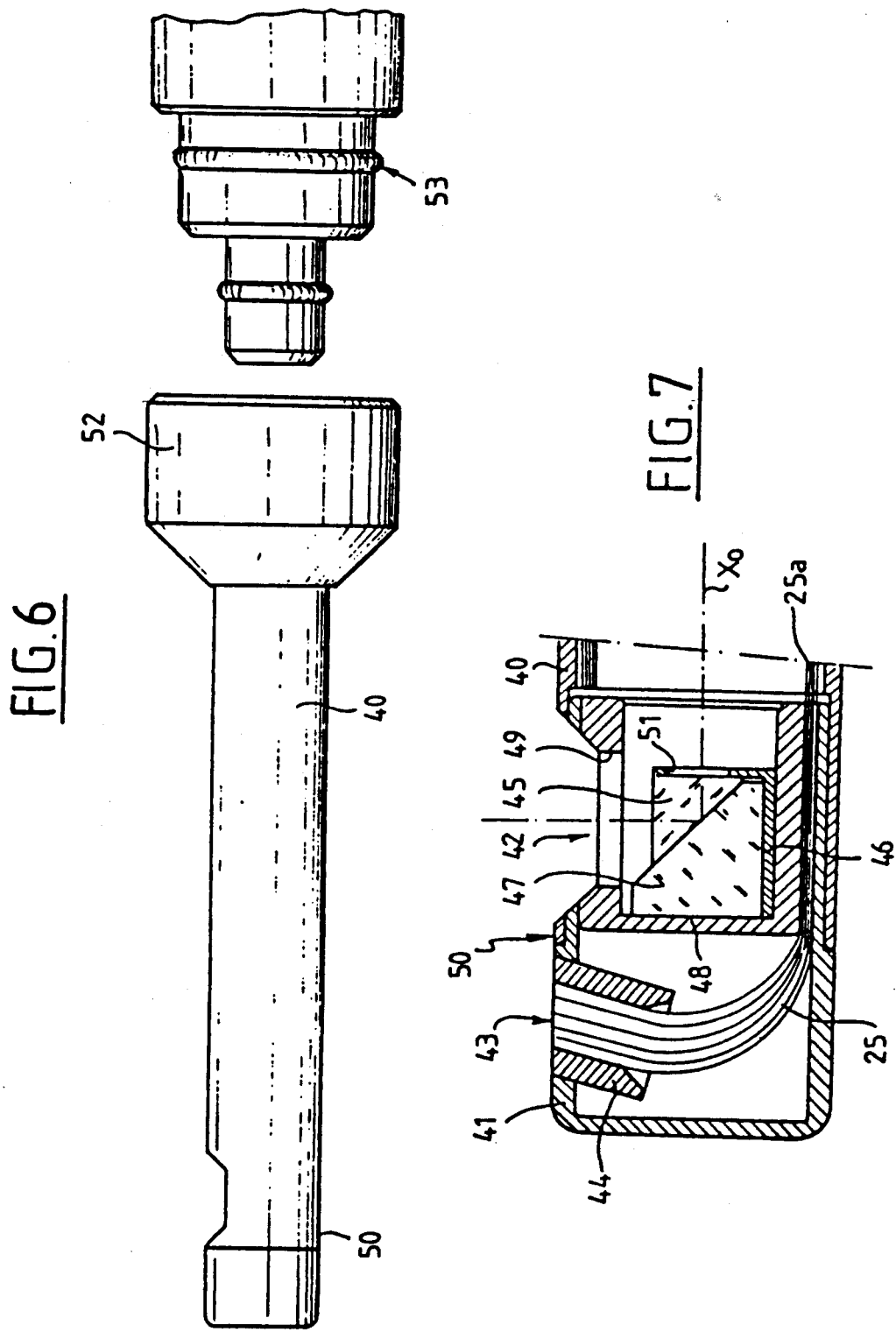

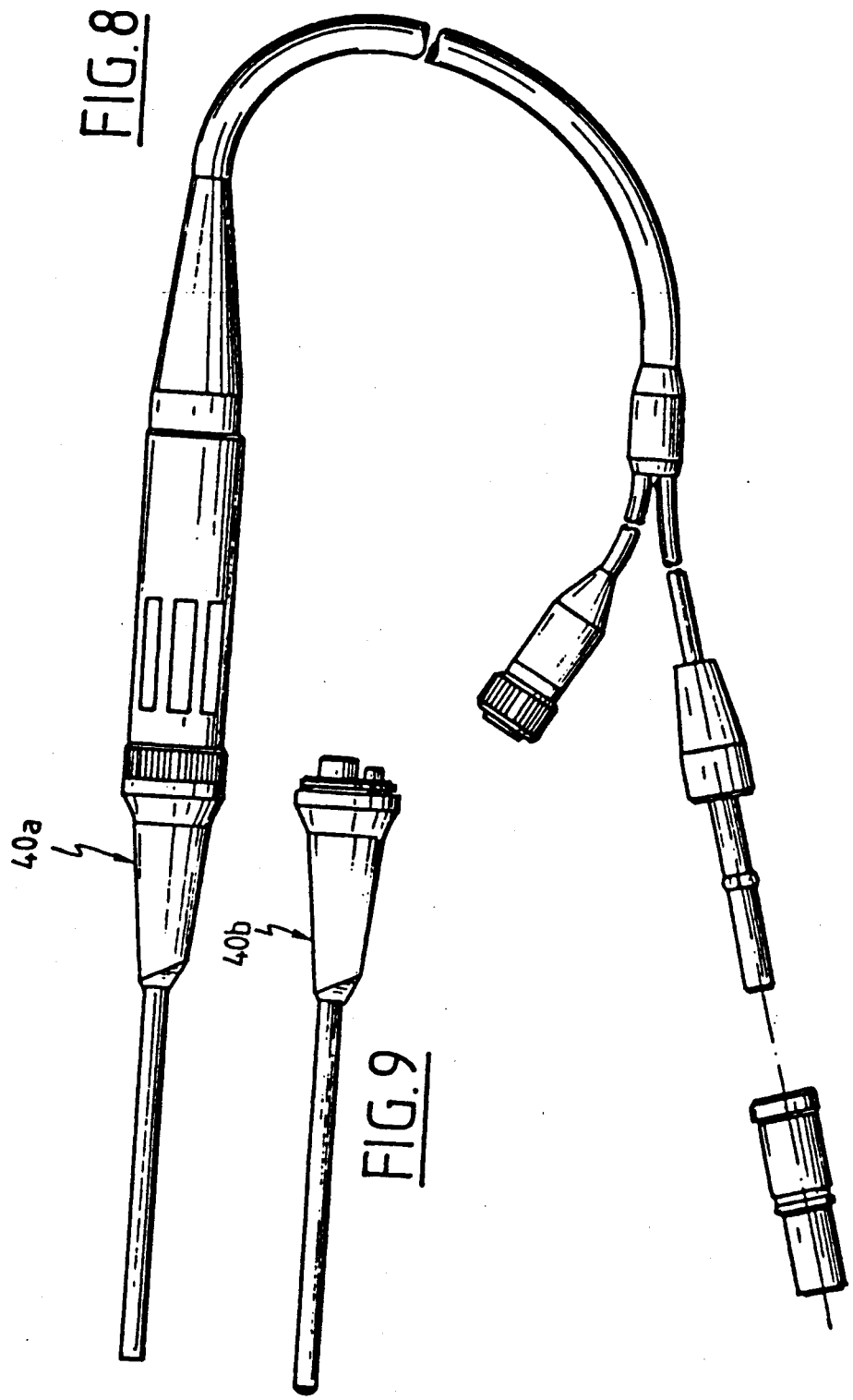

RIGID VIDEO-ENDOSCOPE HAVING A ROTATABLE DEVICE FOR ADJUSTING THE ORIENTATION OF AN IMAGE RELATIVE TO AN IMAGE RECEIVING DEVICE

BACKGROUND OF THE INVENTION

Conventional rigid endoscopes are essentially constituted by a metal tube for gaining access to the object to be observed and an optical system disposed inside the tube and having a set of lenses at one end and an eyepiece at the other end. An object is observed by placing the eye against the eyepiece, thereby receiving an image as conveyed by the optical "collectors".

Some systems allow a TV camera to be fitted to the eyepiece, with the overall assembly then being relatively heavy and mechanically inconvenient. These are called rigid video-endoscopes.

Given that it is rare, in practice, for an observer or a camera to be optimally oriented relative to an object to be observed, it is necessary to be able to adjust the orientation of the image provided by the optical system relative to the observer or to the above-mentioned camera.

In general, such image rotation is obtained in the prior art merely by rotating the tube that gives access to the objects to be observed. However, this manual operation is very fiddly because of the large number of connecting optical and electrical cables which end up by becoming tangled.

The object can be viewed either directly or obliquely (in particular at 90° or 60°) relative to the optical axis of the endoscope, with oblique viewing normally being obtained by means of a mirror disposed at the distal end of the tube giving access to the above-mentioned object.

However, at present, different endoscopes are used depending on whether the object is to be viewed directly or obliquely (or laterally), thereby increasing cost. In addition, when viewing obliquely, the use of a mirror presents at least two drawbacks, of which the first is due to reflection both on the silvered surface of the mirror and on the glass supporting the silvered surface, thereby creating an optical effect of superposed images which hinders viewing, and the second drawback is due to the deposition of pollutants (in particular dust) which are difficult to remove by virtue of the difficulty of gaining access to the inside of the tube containing the mirror and the danger of damaging the support glass, in particular by abrading it, which would therefore further degrade viewing.

The object of the present invention is therefore to provide a rigid video-endoscope which is more suitable for practical requirements than previously known rigid video-endoscopes seeking to perform the same function. In particular, the present invention seeks to make it easy to orient the image of the object to be observed as provided by the optical system without any danger of tangling the various cables.

Another object of the present invention is to provide a rigid video-endoscope which can be used either for direct viewing or for oblique viewing, depending on requirements, thereby avoiding the need to use two different devices.

SUMMARY OF THE INVENTION

The present invention provides a rigid video-endoscope comprising:

an optical system disposed at one end and intended to provide an image of an object to be observed, said optical system being received inside a tube for giving access to said object;

a camera whose axis is in alignment with the optical axis of the optical system and which is intended to pick up the image provided by the optical system (which camera may be connected to digital image-processing means which is in turn connected to a computer for control purposes and to a screen for displaying the image formed in this way after being picked up and processed);

a bundle of optical fibers intended firstly to be connected to a light source and secondly to illuminate the object to be observed, said bundle passing along said tube giving access to the above-mentioned object; and optical and electrical cables, wherein said video-endoscope further includes a device for rotating the image provided by the optical system in order to optimally adjust the orientation of the image relative to an observer, which image rotating device is disposed inside a handle of the video-endoscope preferably together with the camera, between said camera and the optical system.

In an advantageous embodiment of a video-endoscope of the invention, the said image rotating device comprises:

a system of prisms for rotating the image provided by the optical system through an angle $2\alpha$ when it is itself rotated about its axis through an angle $\alpha$;

a cage in which the system of prisms is mounted; and means for actuating said cage from the outside, said means being accessible from the outside by passing through a transverse slot provided through the cylindrical outer wall of the handle over a sufficient length to allow the cage to rotate through at least 180° together with the system of prisms contained therein, said rotation thus corresponding to the image being rotated through 360°, said cage being mounted free to rotate inside a support ring fixed to the handle.

In another advantageous embodiment of a video-endoscope of the invention, the optical and electrical cables which are fitted with respective connectors, are themselves combined outside the handle in a single composite cable terminating at the proximal end of the handle of the video-endoscope, said cables separating inside the handle, with the electrical cable being connected to the camera and with the optical cable being moved away from the mechanical axis of the handle and passing to one side of the above-mentioned support ring in order to reach said access tube in which the optical fibers are disposed so as to constitute an optical cylinder surrounding the above-mentioned optical system, such that the object to be observed is illuminated by means of a ring of light appearing at the distal end of the viewing tube when the optical cable is connected to said light source.

"In the context of the present invention, a tube is also provided gaining access to the object to be viewed, which tube is removable and interchangeable in particular as a function of the lateral angle at which an object is viewed relative to the optical axis of the video-endoscope as well as a function of the diameter and/or the length of the access tube."

In addition to the above dispositions, the invention includes further dispositions which appear from the following description.

BRIEF DESCRIPTION OF THE DRAWINGS

Embodiments of the invention are described by way of example with reference to the accompanying drawings, in which:

FIG. 4 is an axial section through the handle of the FIG. 3 video-endoscope;

FIG. 5 shows a variant of the image rotating means which is slightly different from that shown in FIG. 4;

FIG. 6 is a side elevation of a variant tube for gaining access to the object to be viewed by means of the video-endoscope, this variant enabling a direct viewing video-endoscope to be transformed into an oblique viewing video-endoscope;

FIG. 7 is a section view through the end of the tube shown in FIG. 6 for giving access to the object to be viewed, and showing certain constructional details; and FIGS. 8 and 9 show two further removable and interchangeable variants of the optical system.

It should naturally be understood that these drawings and the corresponding portions of the description are given purely by way of example and that they do not limit the scope of the invention.

DETAILED DESCRIPTION

Figure 1:
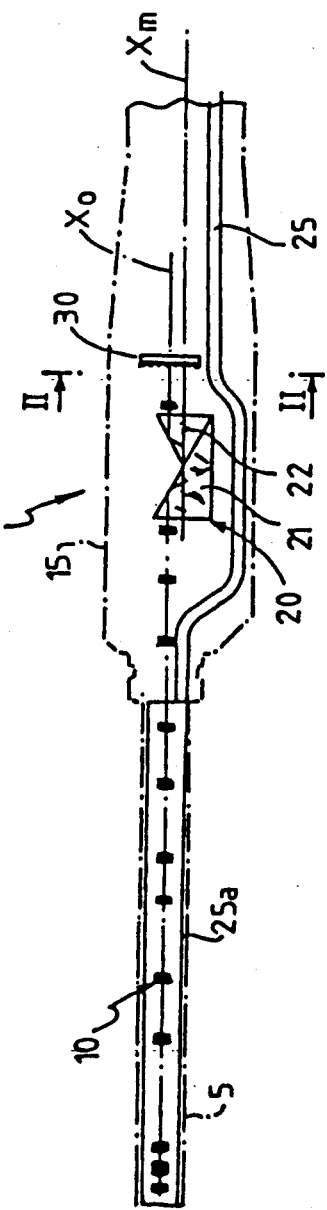
FIG. 1 is a diagram showing how a video-endoscope of the invention operates.

FIG. 1 is a diagram showing a set or "train" of lenses 10 as contained for the most part within a tube 5 giving access to an object (not shown) to be viewed, said tube being drawn in dot-dashed lines in FIG. 1. This optical system of lenses constituting an optical "train" 10 extends a little way into the handle 15 (likewise drawn in dot-dashed lines in FIG. 1) of the video-endoscope 1 so that the axis Xo of the optical system encounters a system of prisms 20 which is suitable for rotating about its own axis Xm (corresponding to the mechanical axis of the rigid video-endoscope of the invention), and which is disposed between the optical "train" 10 and a miniature camera 30 which is preferably also disposed, like the system of prisms 20, inside the handle 15. It may be observed that the optical axis Xo is off-center relative to the mechanical axis Xm (cf. FIG. 2).

Figure 2:
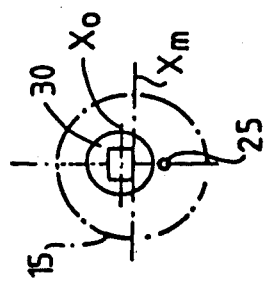
FIG. 2 is a view on plane II situated between the image rotating device of the invention and the camera, showing how the optical axis is off-center relative to the mechanical axis of the video-endoscope.

FIGS. 1 and 2 also show, in diagrammatic form, the path followed by the bundle 25 of optical fibers required for illuminating the object to be viewed. After running along the handle, close to an inside wall thereof, the optical fibers 35 of the bundle 25 follow the inside wall of the access tube 5 inside which they are disposed in such a manner as to constitute an optical cylinder 25a making it possible to obtain an annular disposition of the optical fibers 35 at the distal end of the axis tube 5 so that when the bundle of fibers 25-25a is connected to a light source (not shown) its distal end gives rise to a ring of light.

The system of prisms 20 is essentially constituted by two prisms 21 and 22 with the prism 21 having a section in the form of a right angle triangle (with two acute angles equal to 60° and 30° in the example shown), whereas the section of the prism 22 is an equilateral triangle, and the prism 22 has one of its faces glued to the large face of the prism 21 (close to the 30° angle), as can be seen in particular in FIGS. 1 and 4. The glue is a special transparent glue having optical properties and well known to persons skilled in the art. In particular, it may be polymerizable on being exposed to ultraviolet radiation.

It is easily verified that a light path (in particular the path which coincides with the optical axis Xo) is subjected to three reflections inside the system 20 of prisms 21 and 22 such that the optical path leaving the system is in alignment with the optical path entering the same system. This means that the system 20 of prisms 21 and 22 is equivalent to an optical plate having parallel faces, but within which the light path is lengthened relative to the distance between the two end faces of the equivalent plate by the three above-mentioned reflections. These three reflections take place on the large face of the prism 21, on the horizontal face of the same prism 21, and on the sloping face of the prism 22 that is not in contact with the prism 21 (see FIGS. 1 and 4).

The person skilled in the art can easily verify that the system of prisms serves to rotate an image through an angle equal to $2\alpha$ when the system is rotated about its axis through an angle $\alpha$.

The image rotating device constituted, in part, by the system of prisms 20, is shown in greater detail in FIG. 4, where it can be seen that the two prisms 21 and 22 are received in a seat provided inside a rotary cage 23. The cage is mounted to rotate inside a ring 24 which is fixed to the handle 15 of the video-endoscope. More precisely, the ring is fixed to the inside wall of the proximal portion 16 of the handle 15, e.g. by welding or by any other appropriate means.

Figure 3:
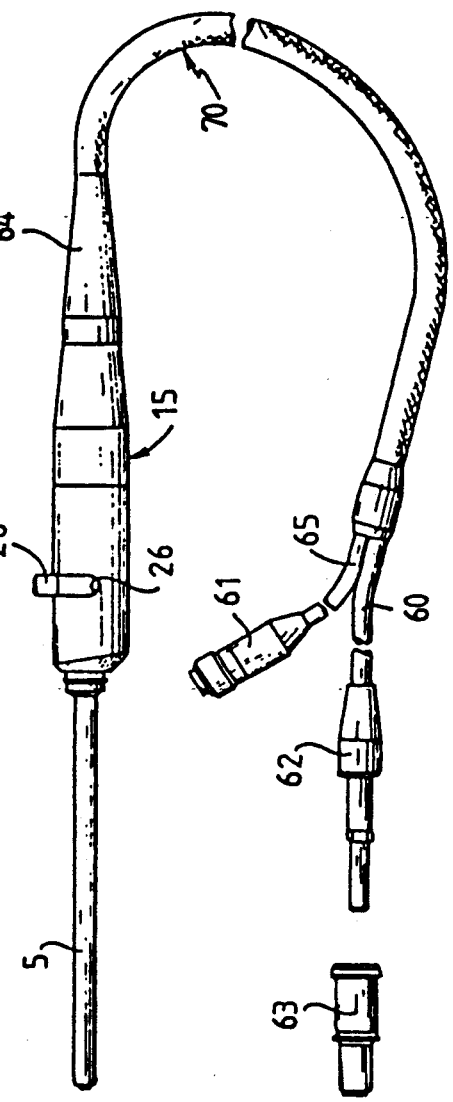
FIG. 3 is an overall view of a video-endoscope of the invention.

A knob 28 extending perpendicularly to the axis Xm of the video-endoscope is fixed to the wall of the cage 23 and enables the cage to be rotated, thereby rotating the system of prisms contained therein. To this end, a transverse slot 26 (see FIG. 3) is provided through the outer cylindrical wall of the proximal portion 16 of the handle 15 so that the operating knob 28 projects outside the handle. The length of the transverse slot 26 is sufficient, as shown in FIG. 3, to enable the cage and the system of prisms it contains to rotate through 180°, thereby enabling the image from the optical system 10 to be rotated through 360°.

It may also be observed in FIG. 4 that there is a tube 5a which directly contains the system of lenses 10 and which, together with the bundle of optical fibers (spread out in the form of an optical cylinder 25a) runs along the tube 5 giving access to the object to be observed. The proximal end 6 of the tube 5a is received in the central opening in the support ring 24 and the wall of this opening is locally thickened in order to imprison the end 6 of the tube 5a. The tube is sealed and the system of lenses contained therein is protected by a lens 8. Similarly, the system 20 of prisms 21 and 22 is sealed and protected by another lens 9 housed in the proximal end of the rotary cage 23.

A variant of the image rotating device of the invention is shown in FIG. 5 where an outer sleeve 27 is provided for sealing the transverse slot 26, and this is useful in some applications for the video-endoscope. Naturally the operating knob 28a for rotating the cage 23 is adapted in this case to the presence of the sealing sleeve 27.

FIG. 6 shows a variant embodiment of the tube 40 giving access to the object to be displayed. This variant is removable and interchangeable with the tube 5 and its provides for viewing the said object obliquely, in particular at 90°. The distal end 50 of the tube comprises a blind endpiece 41 fitted with first and second lateral windows 42 and 43. The window 42 is an oblique viewing window, in particular disposed at 90° relative to the optical axis Xo of the video-endoscope, whereas the window 43 which co-operates with a guide sleeve 44 running along a sloping axis serves to bring the cylindrical bundle of optical fibers 25a close to the object to be viewed after the bundle has been reconstituted in the form of a compact bundle 25. Illumination is thus provided laterally relative to the optical axis Xo.

Viewing deflection, in particular through 90°, is provided by a prism 45 carried by first and second supports 46 and 47 received in a blind ring 48 fixed in the blind endpiece 41 and fitted with a window 49 in alignment with the window 42 in the endpiece. The prism 45 is a 45° prism and its support has a window 51 on the side of the prism which is perpendicular to the optical axis, and it has said axis passing therethrough, thus enabling the object to be viewed at 90° as mentioned above.

The removable access tube 40 is put into place by means of a socket 52 (see FIG. 6) which is rotatably mounted on an O-ring 53.

It is also clear that the presence of the prism 45 gives rise to an additional reflection relative to the reflections due to the system 20 of prisms 21 and 22.

A removeable and interchangeable variant may also be provided, not only for oblique viewing, e.g. at 90°, but also for direct viewing, thereby enabling a common camera such as that described above which is received in the handle of the video-endoscope to be associated with various different interchangeable optical systems for changing not only the viewing axis (direct or oblique), but also for changing the diameter and/or the length of the tube giving access to the object to be observed.

By way of non-limiting example, FIGS. 8 and 9 show two other removable and interchangeable variants of the tube. Reference 40a designates a direct viewing axis tube which is removably connected to the handle of the video-endoscope and which is suitable for interchanging with a different axis tube of the same type but which is different in length and/or diameter, or else with a tube 40b of the type shown in FIG. 6, or of the type shown in FIG. 9 which provides for oblique viewing, in particular at 90°.

FIGS. 8 and 9 are not given further reference numerals since the items shown therein are to be found in the preceding figures. It should also be observed that the operating knob has been omitted from FIG. 8.

With reference to the overall view of FIG. 3, it may be observed that the presence of a single composite cable 70 which includes both the optical cable 60 and the electrical cable 65 which are fitted with respective connectors at their proximal ends (e.g. 61 and 62-63) can be used for connecting the video-endoscope to a digital image-processing device (including a controlling computer fitted with a display monitor) and also to any appropriate light source (not shown).

The single composite cable 70 is contained at its distal end inside a flared part 64 which co-operates with a connector 66 for fixing the cable 70 to the proximal end 17 of the handle 15 of the video-endoscope. The portions 16 and 17 of the handle 15 are screwed together as are the connector 66 and the portion 17. Alternatively, any other appropriate fixing means could be used (see FIG. 4).

Inside the handle 15, the cables 65 and 60, separate with the cables 65 terminating at a miniature camera 30 whereas the cable 60 continues while remaining pressed substantially against one side of the inside wall of the handle 15 until it reaches the tube 5 where the optical fibers 35 are disposed in the form of an optical cylinder 25a, as described above.

The present invention thus provides a rigid video-endoscope which, while still allowing the image to be rotated relative to an observer or a camera is capable of being used either for direct viewing of an object to be observed or for lateral viewing thereof. It is easy to use, it is robust, and it is reliable in operation firstly because it uses a single composite cable and secondly because it uses a miniature camera constituted by a charge coupled device (CCD) forming a miniature color sensor inside the handle of the endoscope. In addition, the concentric disposition of the optical fibers about the optical system makes it possible to obtain symmetrical and uniform lighting which is much more advantageous than the lighting used in the prior art via optical fibers that are separate from the endoscope and situated to one side thereof. It is also clear that image rotation is made possible by having the optical axis off-centered relative to the mechanical axis of the rigid video-endoscope of the invention.

As can be seen from the above, the invention is not limited to any of the particular embodiments described in greater detail. On the contrary, the invention extends to any variant which may occur to the person skilled in the art without going beyond the scope of the claims. For example, the sealing sleeve 27 (see FIG. 5) may co-operate with O-rings 31 and 32 received in two annular grooves provided in the outside face of the wall of the handle 15 of the video-endoscope, thereby improving the sealing of the slot 26. As for the means that provide for oblique viewing of an object, i.e. the prism 45 shown in FIG. 7, they could naturally be supported by means other than those referenced 46 and 47 in FIG. 7 which shows details of the distal end 50 of the access tube 40, providing such support means accurately define the desired lateral observation angle relative to the optical axis Xo of the video-endoscope. Naturally, the means enabling lateral viewing are fixed to the inside wall of the distal end 50 of the axis tube 40. In addition, the distal end 50 of the access tube 40 may be itself removable and interchangeable, in particular as a function of the lateral angle at which the object is viewed relative to the optical axis Xo of the video-endoscope.

I claim:

1. A rigid video-endoscope comprising:
    an optical system disposed at a distal end of an elongated tubular rigid inserting portion and providing an image of an object;
    a solid state image receiving device, whose axis is in alignment with the optical axis of the optical system, for picking up the image provided by the optical system, said image receiving device being connected through an electrical cable to an image processing device disposed outside the video-endoscope;
    a bundle of optical fibers transmitting light from a light source and illuminating the object, said bundle passing along said elongated tubular inserting portion and defining an optical cable;
    wherein said video-endoscope further includes an handle supporting said elongated inserting portion, through a proximal end thereof, and said image receiving means disposed inside said handle, this latter comprising a rotatable device for rotating the image provided by the optical system, in order to optimally adjust the orientatation of the image relative to said receiving means, said rotatable device of the handle being disposed between the optical system and the image receiving device.

2. Video-endoscope according to claim 1, wherein said rotatable device of the endoscope handle comprises:

a system of prisms for rotating the image, provided by the optical system, through an angle $\alpha$;

a cage in which the system of prisms is mounted; and means for actuating said cage from the outside, said means being accessible from the outside by passing through a transverse slot provided through the cylindrical outer wall of the handle over a sufficient length to allow the cage to rotate through at least 180° together with the system of prisms contained therein, said rotation thus corresponding to the image being rotated through at least 360°, said cage being mounted free to rotate inside a supportring fixed to the handle.

3. Video-endoscope according to claim 1, wherein the optical and electrical cables, which are fitted with respecie connectors, are themselves combined outside the handle in a single composite cable terminating at the proximal end of the handle of the video-endoscope, said cables separating inside the handle, with the electrical cable being moved away from the mechanical axis of the handle and passing to one side of the above-mentioned support ring, in order to reach said elongated inserting portion in which the optical fibers are disposed, so as to constitute an optical cylinder surrounding the optical system at the distal end thereof.

4. Video-endoscope according to claim 1, wherein said elongated inserting portion is removable and interchangeable and is fitted with means enabling the object to be viewed obliquely.

5. Video-endoscope according to claim 4, wherein the means for enabling the object to be viewed obliquely comprise a prism received inside the distal end of said elongated inserting portion, where the prism is fixed to support means which define the desired lateral viewing angle relative to the optical axis of the video-endoscope, which support means are fixed to the inside wall of the distal end of the said elongated inserting means.

6. Video-endoscope according to claim 4, wherein the distal end of said elongated iserting portion is removable and interchangeable, in particular as a function of the lateral angle at which the object is viewed relative to the optical axis of the video-endoscope.

* * * * *